United States Patent
Nguyen et al.

(10) Patent No.: US 12,431,805 B2
(45) Date of Patent: Sep. 30, 2025

(54) BUCK-BOOST BASED HIGH LINEARITY DRIVER WITH SEPARATELY CONTROLLABLE DUTY CYCLE FOR ENERGIZING AND DE-ENERGIZING PHASES

(71) Applicant: Robert Bosch GmbH, Stuttgart (DE)

(72) Inventors: Chau Nguyen, Santa Clara, CA (US);
Chinwuba Ezekwe, Albany, CA (US)

(73) Assignee: Robert Bosch GmbH, Stuttgart (DE)

( * ) Notice: Subject to any disclaimer, the term of this patent is extended or adjusted under 35 U.S.C. 154(b) by 204 days.

(21) Appl. No.: 18/469,750

(22) Filed: Sep. 19, 2023

(65) Prior Publication Data
US 2025/0096687 A1    Mar. 20, 2025

(51) Int. Cl.
*H02M 3/158* (2006.01)
*H02M 1/00* (2006.01)
*H02M 1/08* (2006.01)

(52) U.S. Cl.
CPC ....... *H02M 3/1582* (2013.01); *H02M 1/0025* (2021.05); *H02M 1/082* (2013.01)

(58) Field of Classification Search
CPC .. H02M 3/1582; H02M 1/0025; H02M 1/082; H02M 7/48; H02M 7/4815
See application file for complete search history.

(56) References Cited

U.S. PATENT DOCUMENTS

| | | | |
|---|---|---|---|
| 10,291,126 B1 * | 5/2019 | Wei | H02M 3/158 |
| 2017/0194857 A1 * | 7/2017 | Hang | H02M 3/02 |
| 2023/0216409 A1 * | 7/2023 | Ravi | H02M 1/0025 |
| | | | 323/282 |

OTHER PUBLICATIONS

Kusakawa et al., "Further Improvement of a Transformerless, Voltage-Boosting Inverter for AC Modules", Solar Energy Materials & Solar Cells, 2001, pp. 379-387, vol. 67.
Motegi et al., "A Single-Phase Buck-Boost PFC Converter with Output-Voltage, Ripple-Reducing Operation", Electrical Engineering in Japan, 1999, pp. 56-70, vol. 126, No. 2.
Rakanov et al., "A New Grid Tied Transformerless Inverter Topology with Flying Inductor. Part 1: Analysis", International Conference Automatics and Informatics, IEEE, 2020, 5 pages.
Maizonave et al., "Analysis of Current-Bidirectional Buck-Boost Based Switch-Mode Audio Amplifier", The Renewable Energies and Power Quality Journal, May 2011, p. 1350-1355, vol. 1, No. 9.
Kanakasabai et al., "A Novel Tri-State Boost Converter With Fast Dynamics", IEEE Transactions on Power Electronics, Sep. 2002, p. 677-683, vol. 17, No. 5.

* cited by examiner

*Primary Examiner* — Adolf D Berhane
*Assistant Examiner* — Afework S Demisse
(74) *Attorney, Agent, or Firm* — BROOKS KUSHMAN P.C.

(57) ABSTRACT

A variable de-energizing phase duty cycle $D_d$ is generated based on an input signal to optimize for a low duty cycle in a freewheeling phase. A variable energizing phase duty cycle $D_e$ is generated based on a buck-boost control loop tracking the input signal. A tri-state buck-boost converter is controlled using the variable energizing phase duty cycle $D_e$ and the variable de-energizing phase duty cycle $D_d$.

27 Claims, 7 Drawing Sheets

BUCK-BOOST BASED HIGH LINEARITY DRIVER WITH SEPARATELY CONTROLLABLE DUTY CYCLE FOR ENERGIZING AND DE-ENERGIZING PHASES

TECHNICAL FIELD

Aspects of the disclosure relate to a buck-boost based high linearity driver, with separately controllable duty cycles for energizing and de-energizing phases.

BACKGROUND

There are various applications where it is desirable to generate a highly linear, high output voltage across a load based on an input. One such application is an audio power amplifier that generates a voltage to drive a speaker. An example audio amplifier may use a two-stage architecture having a class H boost converter and class D amplifier. To drive the speaker for high volume, the boost converter may generate a voltage higher than the power supply from the battery. Additionally, the supply voltage may track the envelope of the required output voltage. This envelope-tracking and controlling function may be provided by a pulse width modulation (PWM) signal from a controller. The controller may provide a PWM signal to drive the class-D amplifier to generate the output signal.

SUMMARY

In one or more illustrative examples, a tri-state buck-boost system having a freely changeable de-energizing duty cycle is provided. The system includes a tri-state buck-boost converter configured to operate in an energizing phase in which energy of an inductor is increased, a de-energizing phase in which the energy of the inductor is decreased, and a freewheeling phase in which the energy of the inductor is allowed to recirculate. The tri-state buck-boost converter is configured to produce a voltage output based on a power supply voltage, based on a variable energizing phase duty cycle $D_e$ for operation in the energizing phase, and based on a variable de-energizing phase duty cycle $D_d$ for operation in the de-energizing phase. The system further includes a buck-boost control loop, configured to generate the variable de-energizing phase duty cycle $D_d$ based on an input signal to optimize for a low duty cycle in the freewheeling phase, generate the variable energizing phase duty cycle $D_e$ based on a feedback loop tracking the input signal, and control the tri-state buck-boost converter using the variable energizing phase duty cycle $D_e$ and the variable de-energizing phase duty cycle $D_d$.

In one or more illustrative examples, a method for operation of a tri-state buck-boost system includes generating a variable de-energizing phase duty cycle Dd based on an input signal to optimize for a low duty cycle in a freewheeling phase; generating a variable energizing phase duty cycle De based on a buck-boost control loop tracking the input signal; and controlling a tri-state buck-boost converter using the variable energizing phase duty cycle De and the variable de-energizing phase duty cycle Dd.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Disclosed herein is a buck-boost control loop for a three-phase buck-boost circuit having freely changeable duty cycles. The architecture improves operation of the tri-state buck-boost circuit by allowing the duty cycle of de-energizing phase to be freely changeable and independent of the duty cycle of the energizing phase. Compared with a tri-state buck-boost with a fixed de-energizing duty cycle, this approach increases efficiency by reducing slack time spent in the freewheeling phase.

Figure 1:
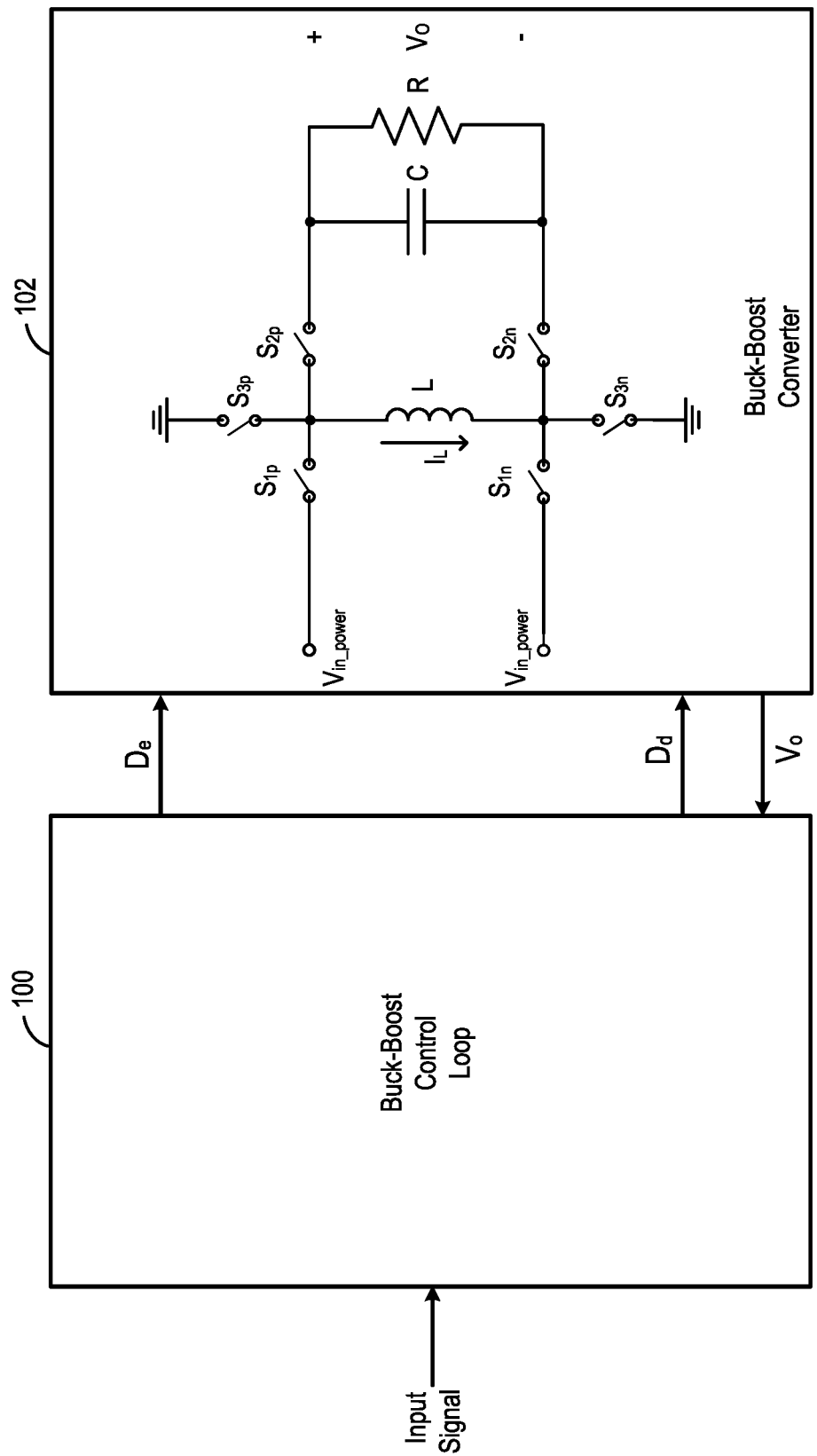
FIG. 1 illustrates a high-level diagram of a buck-boost control loop for controlling a buck-boost converter.

FIG. 1 illustrates a high-level diagram of a buck-boost control loop 100 in combination with a differential buck-boost converter 102. The buck-boost converter 102 includes an inductor L, a capacitor C, and resistance R, in combination with three positive side switches $S_{1p}$, $S_{2p}$, $S_{3p}$ and three negative side switches $S_{1n}$, $S_{2n}$, $S_{3n}$. As shown, switch $S_{1p}$ selectively connects between $V_{in\_power}$ and the inductor L, while switch $S_{1n}$ selectively connects between $V_{in\_power}$ and the other side of the inductor L. The switch $S_{2p}$ selectively connects between the positive side of the inductor L and the positive $V_o$, while the switch $S_{2n}$ selectively connects between the negative side of the inductor L and the negative $V_o$. The switch $S_{3p}$ selectively connects between the positive side of the inductor L and ground, while the switch $S3_n$ selectively connects between the negative side of the inductor L and ground. The capacitor C and resistor R are likewise across the output $V_o$.

The differential buck-boost converter 102 operates in different phases based on the state of the switches. These phases include an energizing phase in which the magnetic energy of the inductor L is increased, a de-energizing phase in which the magnetic energy of the inductor is decreased, and a freewheeling phase in which the current of the inductor L is allowed to recirculate in a loop.

For generating a negative $V_o$, in the energizing phase, switches $S_{1p}$ and $S_{3n}$ are closed, and the rest are open. Or conversely, for a positive $V_o$, switches $S_{1n}$ and $S_{3p}$ are closed and the rest are open. In either approach, current flows from the input voltage source ($V_{batt}$) to the inductor L and the current in the inductor L rises linearly with the slope determined by the input voltage. The duty cycle of this phase is denoted herein as $D_e$.

In the de-energizing phase, switches $S_{2p}$ and $S_{2n}$ are closed, and the rest are open. Thus, in the de-energizing phase, current through the inductor L flows to the output. The current falls linearly with the slope determined by the output voltage. The duty cycle of this phase is denoted herein as $D_d$.

Figure 2A:
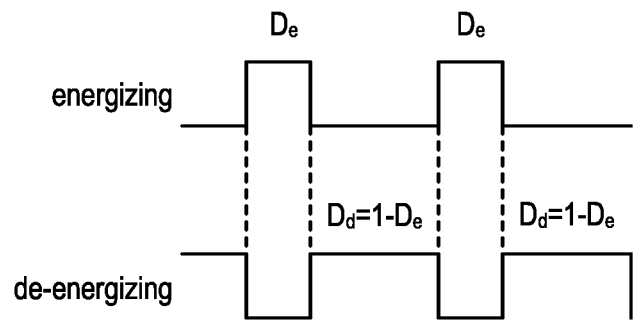
FIG. 2A illustrates an example of a two-phase buck-boost converter timing diagram for operation of the buck-boost converter.

FIG. 2A illustrates an example of a two-phase buck-boost converter 102 timing diagram for operation of the buck-boost converter 102. In a two-phase mode, the buck-boost converter 102 operates in either the energizing phase or the de-energizing phase. In the two-phase approach, the duty cycle of the de-energizing phase is $D_d=1-D_e$. In steady state operation, the rise in current in the energizing phase is equal to the fall in the current in the de-energizing phase. Hence, the output to input voltage transfer relation of the buck-boost can be shown to be equal to $-D_e/(1-D_e)$.

Note that from this transfer relation, it can be seen that the output voltage is not linear with $D_e$. Furthermore, if a full derivation is performed of the small signal transfer function of the buck-boost circuit from the small signal duty cycle $D_e$ to the output voltage, it can be seen that the system contains a right half plane (RHP) zero whose location changes with duty cycle, which makes the control of the system challenging.

To see intuitively why a RHP zero is present, imagine a need to increase the output voltage $V_o$. Since the steady state transfer function is $D_e/(1-D_e)$, this would necessitate an increase in $D_e$, the duty cycle of the energizing phase. However, at that moment when $D_e$ is increased, because the duty cycle of the de-energizing phase is $1-D_e$, its duration is shortened instantaneously causing the output to drop temporarily before increasing to the desired level. It is this initial undershoot that is the manifestation of the RHP zero, putting a constraint on the achievable bandwidth of the control system.

To eliminate the effect of the RHP zero, the buck-boost converter 102 may be operated in a three-phase approach. This tri-state buck-boost includes an energizing phase of duty cycle $D_e$ which is varied with the desired output voltage, a de-energizing phase of fixed duty cycle $D_d=D_{fixed}$, and a freewheeling phase of duty cycle $1-D_e-D_{fixed}$.

Figure 2B:
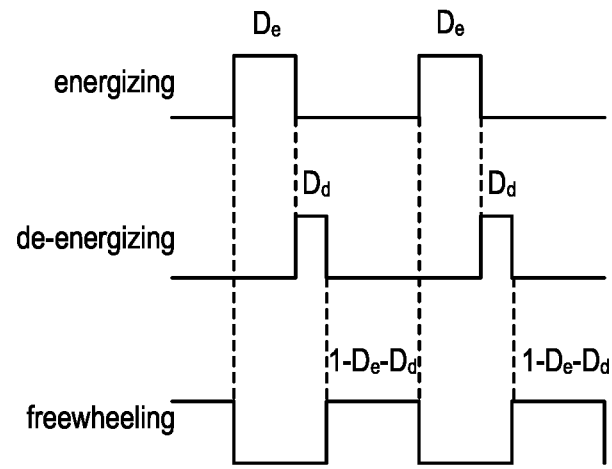
FIG. 2B illustrates an example of a three-phase buck-boost converter timing diagram for operation of the buck-boost converter having a fixed de-energizing duty cycle.

FIG. 2B illustrates an example of a three-phase buck-boost converter 102 timing diagram for operation of the buck-boost converter 102 having a fixed de-energizing duty cycle. In the freewheeling phase, the switches $S_{3p}$ and $S_{3n}$ are closed, and the rest are open, allowing the inductor current to recirculate in a loop (i.e., freewheeling), neither flowing to the output nor the input. The addition of the freewheeling phase allows the de-energizing phase duty cycle to be fixed at $D_{fixed}$. This eliminates the RHP zero as the duty cycle of the de-energizing phase is decoupled from that of the energizing phase. When there is a need to increase the output voltage $V_o$, the duty cycle $D_e$ of the energizing phase is increased. However, since the de-energizing phase duty cycle is fixed, there is no initial undershoot associated with the RHP zero. Furthermore, the steady state voltage transfer function is $D_e/D_{fixed}$, a linear function of $D_e$.

A disadvantage of such a scheme is a loss of efficiency due to the presence of the freewheeling phase. This is especially true at low duty cycle $D_e$, when time spent in the freewheeling phase is large as a percentage of total operation time. To overcome this issue, the tri-state buck-boost may be selectively controlled to allow the duty cycle of de-energizing phase to be freely changeable and independent of the duty cycle of the energizing phase (as opposed to a fixed de-energizing phase).

Figure 2C:
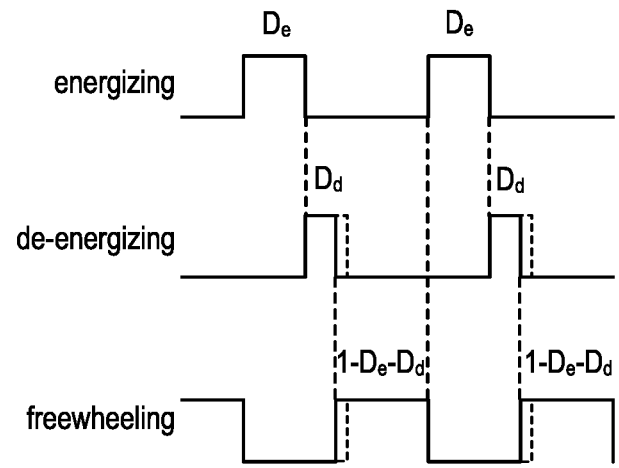
FIG. 2C illustrates an example of a three-phase buck-boost converter timing diagram for operation of the buck-boost converter having a freely changeable duty cycle for de-energizing phase.

FIG. 2C illustrates an example of a three-phase buck-boost converter 102 timing diagram for operation of the buck-boost converter 102 having a freely changeable duty cycle for de-energizing phase. In such a scheme, De is the energizing phase duty cycle, $D_d$ is the de-energizing phase duty cycle and $1-D_e-D_d$ is the freewheeling phase duty cycle. Note that $D_e$ and $D_d$ are freely changeable and independent from each other.

Table 1 provides a comparison for the duty cycle timing information between the three different schemes:

TABLE 1

| Duty Cycle Timing Comparison Between Modes of Operation | | | |
| --- | --- | --- | --- |
| | Energizing | De-energizing | Freewheeling |
| Standard buck-boost | $D_e$ | $D_d = 1-D_e$ | 0 |
| Tri-state buck-boost with fixed de-energizing duty cycle | $D_e$ | $D_d = D_{fixed}$ | $1-D_e-D_{fixed}$ |
| Tri-state buck-boost with freely changeable de-energizing duty cycle | $D_e$ | $D_d$ | $1-D_e-D_d$ |

The advantage of making the duty cycle of the de-energizing phase freely adaptable instead of fixing it is to enable the freewheeling duty cycle to be optimized and kept low. This aids in keeping the root mean square (RMS) current through the inductor low and hence increase the efficiency. A possible disadvantage is that the input to output linearity is degraded, potentially leading to worsened total harmonic distortion (THD).

Figure 3:
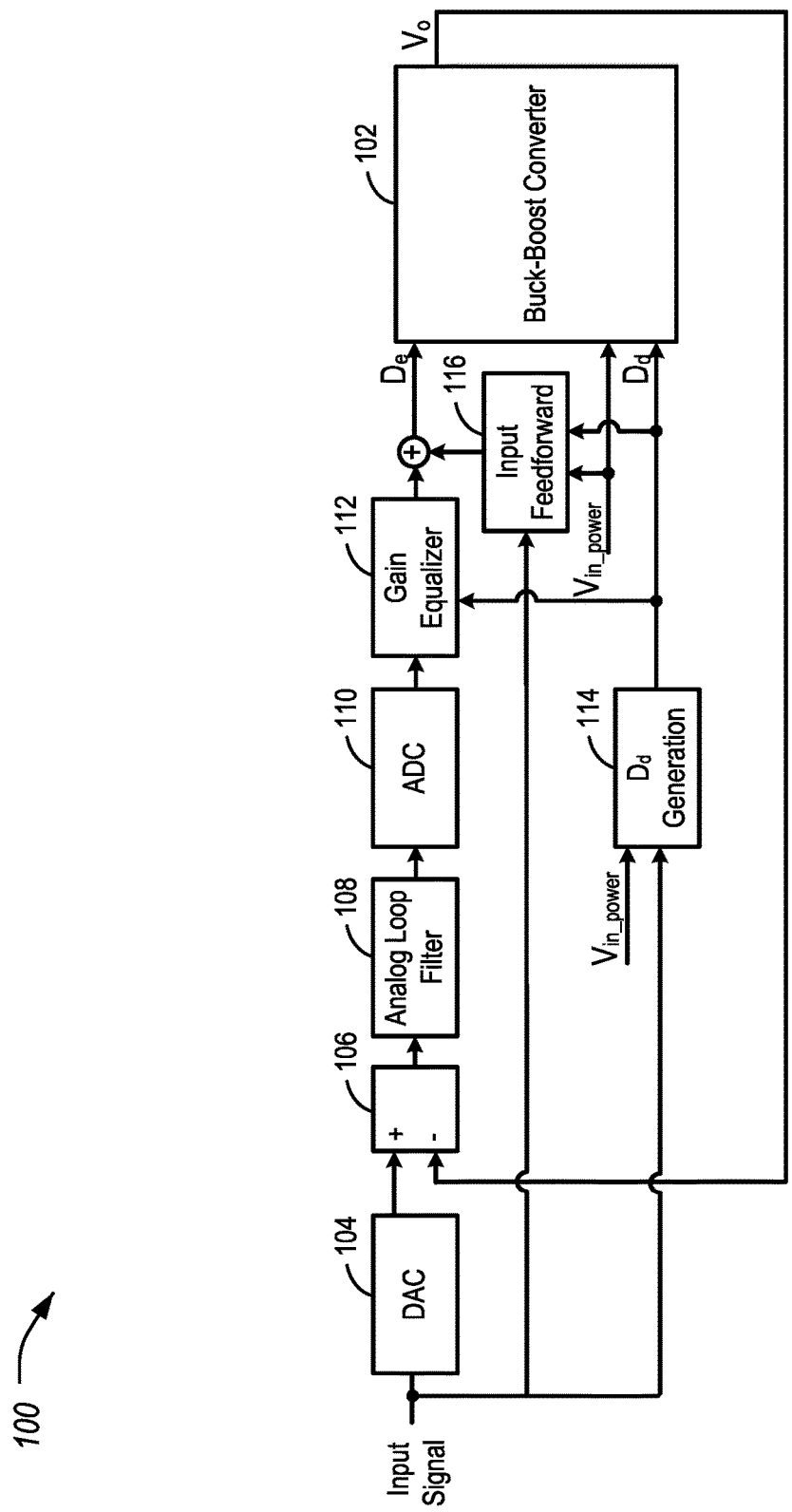
FIG. 3 illustrates an example buck-boost control loop for controlling the buck-boost converter in the three-phase timing having a freely changeable duty cycle for the de-energizing phase.

FIG. 3 illustrates an example buck-boost control loop 100 for controlling the buck-boost converter 102 in the three-phase timing having a freely changeable duty cycle for the de-energizing phase. As shown, in connection with the buck-boost converter 102 discussed above, the buck-boost control loop 100 includes a digital-to-analog converter (DAC) 104, a subtracter 106, an analog loop filter 108, an analog-to-digital converter (ADC) 110, a gain equalizer 112, a $D_d$ generation 114 block, and an input feedforward block 116

The buck-boost control loop 100 implements a feedback control system where the buck-boost converter 102 is the plant, controlled by two inputs: an energizing duty cycle $D_e$ and a de-energizing duty cycle $D_d$. To use the example of FIG. 1, in the energizing duty cycle $D_e$, switches $S_{1p}$ and $S_{3n}$ or switches $S_{1n}$ and $S_{3p}$ are closed, and the rest are open; in the de-energizing duty cycle $D_d$, switches $S_{2p}$ and $S_{2n}$ are closed, and the rest are open; and in the freewheeling phase between $D_e$ and $D_d$ the switches $S_{3p}$ and $S_{3n}$ are closed, and the rest are open. The $V_{in\_power}$ is the power supply to the buck-boost converter 102, which may be a battery voltage or other voltage source. The output voltage $V_o$ refers to the output of the buck-boost converter 102.

A digital input signal is applied to the DAC 104. A converted analog output form the DAC 104 is applied to the subtracter 106 as an input reference. The output voltage $V_o$ is measured and subtracted from the input reference by the subtracter 106, resulting in an error signal. This error signal is then applied to the analog loop filter 108 (e.g., an analog continuous time loop filter), which helps to suppress non-linearity. The analog signal output from the analog loop filter 108 is then digitized by the ADC 110. The resultant signal is then multiplied by a scaling factor that is inversely proportional to $D_d$ by the gain equalizer 112 to achieve a constant unity gain frequency for the loop gain.

To achieve an optimized freewheeling duty cycle, the de-energizing duty cycle $D_d$ is not fixed but varied. This is obtained by the action of the $D_d$ generation 114 block. Because both $D_d$ and the input are changing, to achieve a fast response for the loop, $D_d$, the input signal in digital form and the $V_{in\_power}$ are fed forward to $D_e$ to enable the system to reach the final settled $D_e$ faster. This is done in the input feedforward block 116.

The analog loop filter 108 may be a low pass filter (e.g., a high-order low pass filter but not necessarily high-order). One of the functions of the analog loop filter 108 is to provide a high gain to suppress the non-linearity within the frequency band of interest. Another function of the analog loop filter 108 is to provide overall phase lead to stabilize the loop. Yet another function of the analog loop filter 108 to perform anti-aliasing filtering for the ADC 110 that follows.

Because it is easier to do gain equalization and $D_d$ feedforward in the digital domain, there is a need to convert the signal from analog to digital. Note that because the ADC 110 follows the analog loop filter 108, its noise requirement is significantly relaxed. There are variations of the architecture depending on where to put the ADC 110, some of which are discussed below with respect to FIGS. 5-6.

The gain-bandwidth product of the transfer function of the buck-boost converter 102 from its input $D_e$ to its output $V_o$ is proportional to the de-energizing duty cycle $D_d$. Without any equalization, the gain-bandwidth will thus be high for high $D_d$ and low for low $D_d$, making it difficult to design for good loop-gain settling performance. Hence to ensure that the control loop gain has a constant unity gain frequency, which allows for optimal performance to be obtained, the gain equalizer 112 is configured to receive signal which is multiplied with a factor $K/D_d$, where K is a constant. Adjustment of K allows the unity gain frequency to be placed at a desired location (e.g., at the point for highest phase margin).

The $D_d$ Generation 114 block generates a variable $D_d$ based on the input signal so as to optimize for a low freewheeling duty cycle, in order to keep the rms inductor current low for good efficiency. Several approaches may be utilized to generate $D_d$.

In a first approach, Dd Generation 114 block generates $D_d$ as shown by Equation (1):

$$D_d = \frac{(1-f)V_{in\_power}}{|V_{in\_signal}| + V_{in\_power}} \quad (1)$$

where:

$D_d$ is the output of the $D_d$ generation 114 block, the de-energizing duty cycle input for the buck-boost converter 102;

$V_{in\_power}$ is the power supply voltage for the buck-boost, e.g., the battery voltage;

$V_{in\_signal}$ is the input voltage to the control loop, which indicates the desired output voltage $V_o$ of the buck-boost converter 102; and f is the desired freewheeling duty cycle. This may be a fixed constant, for example 0.1.

It should be noted that $D_d$ is generated by the $D_d$ generation 114 block according to Equation 1, whereas $D_e$ is generated by the action of the feedback loop. The freewheeling duty cycle is the remainder of the cycle, thus=$1-D_d-D_e$. This approach to generating $D_d$ helps to keep the actual freewheeling duty cycle low. However, because the buck-boost control loop 100 has delay and non-ideality, the actual freewheeling duty cycle will not be equal to f at all times but rather its average will tend to be equal to f.

Figure 4:
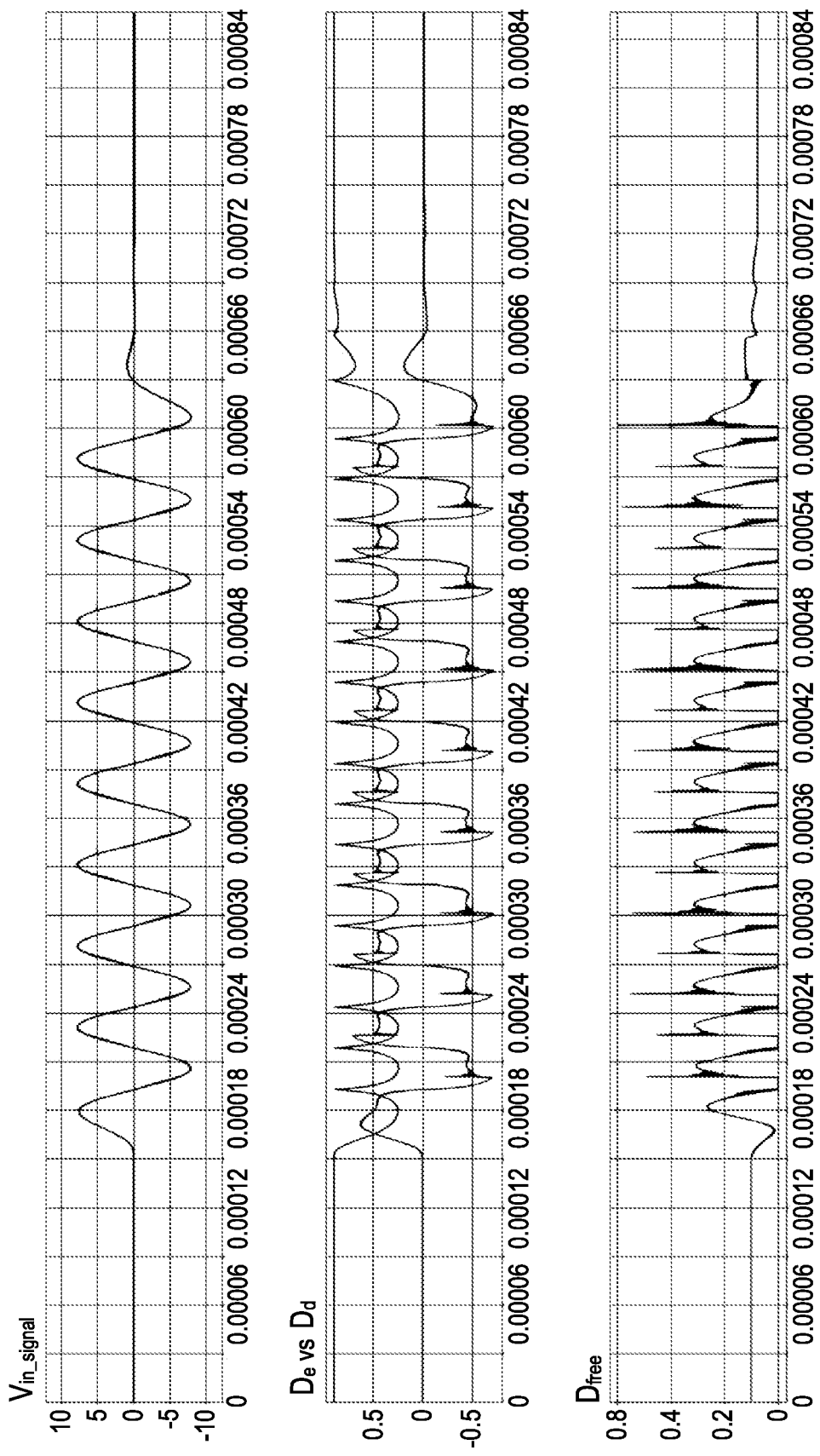
FIG. 4 illustrates an example graph of aspects of the operation of the buck-boost control system architecture of FIG. 3 controlling the buck-boost converter in the three-phase timing.

FIG. 4 illustrates an example graph of aspects of the operation of the buck-boost control loop 100 of FIG. 3 controlling the buck-boost converter 102 in the three-phase timing. As shown in the top portion of the graph, a sinusoidal input is applied as $V_{in\_signal}$, having been passed through a 20 Hz-20 kHz bandpass filter to band-limit the input so that it is a true audio signal (with other non-audio frequencies removed). $D_d$ and $D_e$ are shown in the middle portion of the graph, with $D_d$ being the upper trace and $D_e$ being the lower trace. $D_{free}$ is the actual freewheeling duty cycle, shown in the bottom portion of the graph.

It should also be noted that when $V_{in\_signal}$ is zero, $D_d$ is set at its maximum 1-f. Ideally $D_e$ is 0, however due to the delay and non-ideality in the system, De may not be exactly 0 and could be a large number. Since $D_d$ is set at its maximum, the summation of $D_d+D_e$ could potentially exceed 1, causing system saturation to occur since this is not physically possible. This is shown in the above figure as regions where $D_{free}$ is identically 0. As the system becomes saturated, the linearity may therefore decrease.

Returning to FIG. 3, to overcome this issue a second approach may be utilized. In the second approach, $D_d$ Generation 114 block generates $D_d$ as shown by Equation (2):

$$D_d = \frac{(1-f)V_{in\_power}}{\sqrt{V_m^2 + V_{in\_signal}^2} + V_{in\_power}} \quad (2)$$

where $V_m$ is a real positive coefficient.

Note that when $V_{in\_signal}$ is large with respect to $V_m$, that $$\sqrt{V_m^2 + V_{in\_signal}^2} \approx |V_{in\_signal}|.$$

In that case, this second approach gives approximately the same value for $D_d$ as the first approach. The advantage comes for the case when $V_{in\_signal}$ is =0. In such a situation, $$\sqrt{V_m^2 + V_{in\_signal}^2} = V_m$$

instead of 0 as in the first approach. Thus $D_d$ will be lowered to $$\frac{(1-f)V_{in\_power}}{V_m + V_{in\_power}}$$

instead of 1−f as in the first approach. A lower $D_d$ allows more room for $D_e$. This may accordingly aid in avoiding system saturation.

However, the second approach may have potential issues when $V_{in\_signal}$ is 0 but is not changing (as shown in the initial period in FIG. 4). In such a situation $D_e$=0. As such it may be desirable to set $D_d$ at its maximum value 1−f instead of the lower $$\frac{(1-f)V_{in\_power}}{V_m + V_{in\_power}}$$

to minimize the freewheeling duty cycle and maximize efficiency.

This could be overcome by using a variable $V_m$ instead of a fixed value. The value of $V_m$ could be adjustable in different approaches. As one possibility, the constant $V_m$ in the expression is replaced with a low pass filtered version of $V_{in\_signal}$. This way, when $V_{in\_signal}$ is 0 and unchanging, $V_m$ is 0. When $V_{in\_signal}$ is 0 but is changing, $V_m$ is non-zero. This is shown in Equation (3):

$$D_d = \frac{(1-f)V_{in\_power}}{\sqrt{[k \cdot H_{LPF}(V_{in\_signal})]^2 + V_{in\_signal}^2} + V_{in\_power}} \quad (3)$$

where:
k is a constant coefficient; and
$H_{LPF}$ is the low pass filter transfer function.

Yet, as any filtering implies delay, a second possibility to varying $V_m$ may be used. In the second possibility, the constant $V_m$ is replaced with the derivative of $V_{in\_signal}$ which also achieves the same effect. This second possibility is shown in Equation (4):

$$D_d = \frac{(1-f)V_{in\_power}}{\sqrt{\left(k\frac{dV_{in\_signal}}{dt}\right)^2 + V_{in\_signal}^2} + V_{in\_power}} \quad (4)$$

where k is a constant coefficient.

Finally, regarding the input feedforward block 116, from the values of $V_{in\_signal}$, $V_{in\_power}$ and the value of $D_d$, the anticipated value of $D_e$ may be computed as shown in Equation (5) and added to the signal path to generate $D_e$. This helps the system settles faster, improving linearity.

$$D_e = \frac{V_{in\_signal}}{V_{in\_power}} D_d \quad (5)$$

Figure 5:
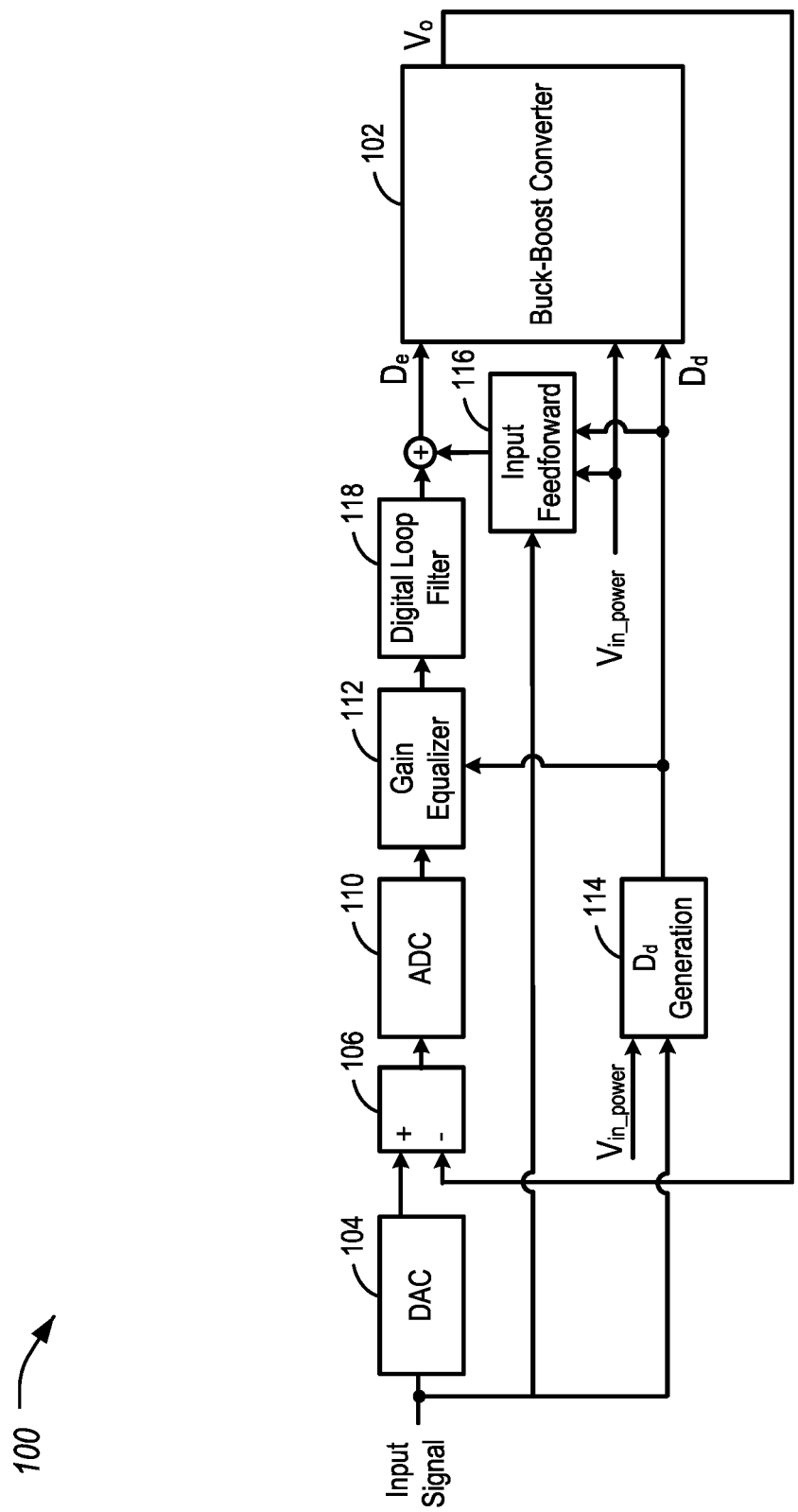
FIG. 5 illustrates an alternate example buck-boost control loop for controlling the buck-boost converter in the three-phase timing having a freely changeable duty cycle for the de-energizing phase.

FIG. 5 illustrates an alternate example buck-boost control loop 100 for controlling the buck-boost converter 102 in the three-phase timing having a freely changeable duty cycle for the de-energizing phase. In this alternate, the ADC 110 is placed in front of the loop filter, which is implemented digitally as a digital loop filter 118, instead of using the analog loop filter 108. However, the operation of the digital loop filter 118 is consistent with the above discussion of the analog loop filter 108.

Figure 6:
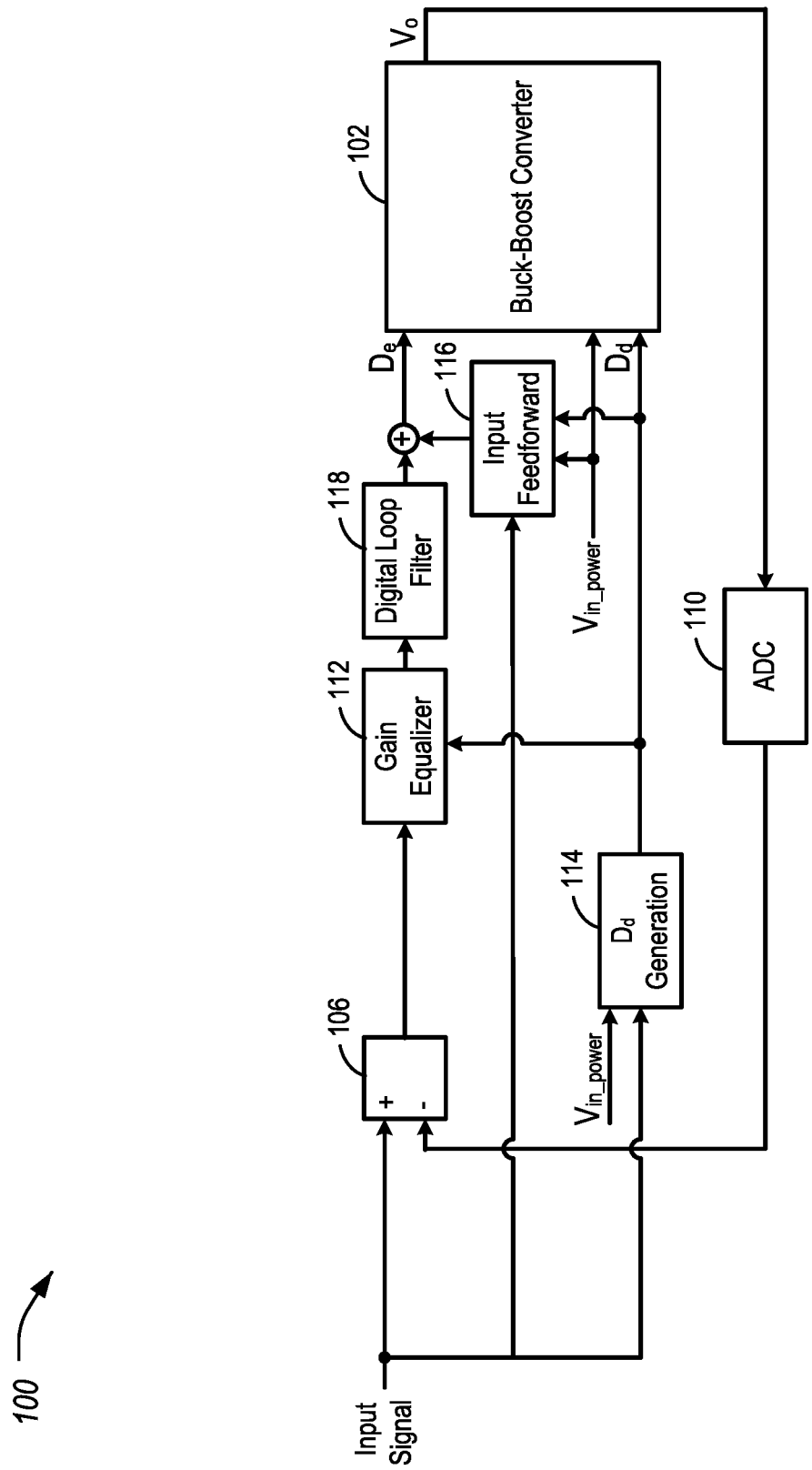
FIG. 6 illustrates yet another alternate example buck-boost control loop for controlling the buck-boost converter in the three-phase timing having a freely changeable duty cycle for the de-energizing phase.

FIG. 6 illustrates yet another alternate example buck-boost control loop 100 for controlling the buck-boost converter 102 in the three-phase timing having a freely changeable duty cycle for the de-energizing phase. In this variation, the ADC 110 is provided in the feedback path. As yet another variation (not shown), the order of the analog loop filter 108/digital loop filter 118 and the gain equalizer 112 could also be interchanged (albeit with a reduction in linearity).

Figure 7:
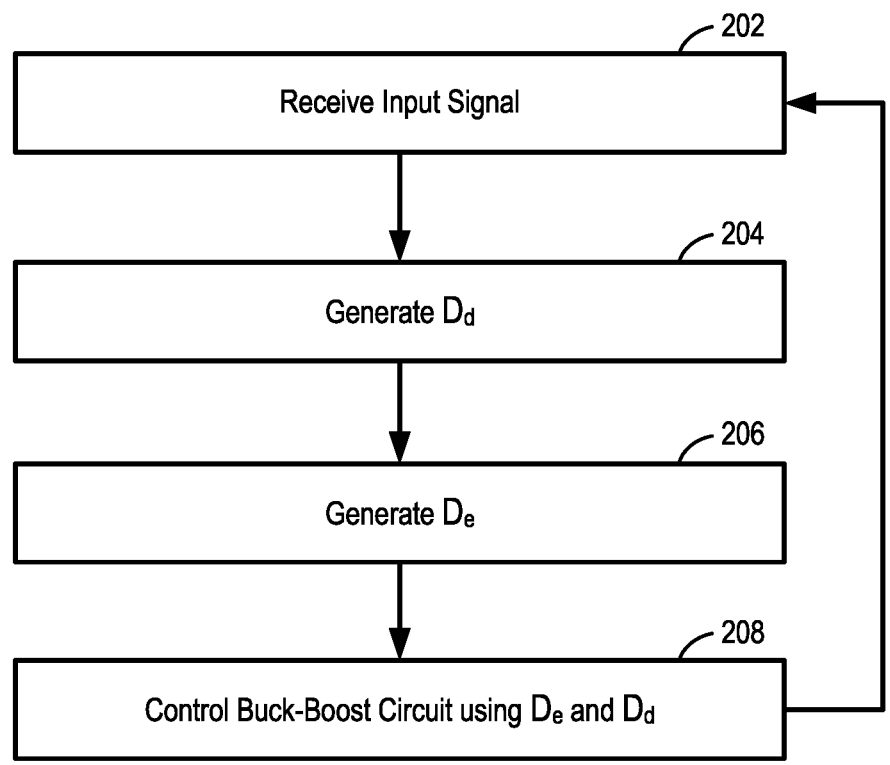
FIG. 7 illustrates an example process for the operation of the buck-boost control loop for controlling the buck-boost converter.

FIG. 7 illustrates an example process 200 for the operation of the buck-boost control loop 100 for controlling the buck-boost converter 102. As noted herein, the tri-state buck-boost converter 102 is configured to operate in an energizing phase in which energy of an inductor is increased, a de-energizing phase in which the energy of the inductor is decreased, and a freewheeling phase in which the energy of the inductor is allowed to recirculate. Also as noted herein, the tri-state buck-boost converter 102 configured to produce a voltage output based on a power supply voltage, a variable energizing phase duty cycle $D_e$ for operation in the energizing phase, and a variable de-energizing phase duty cycle $D_d$ for operation in the de-energizing phase.

At operation 202, the buck-boost control loop 100 receives an input signal. In an example, the input signal may be an audio signal to be amplified to drive a speaker. In other examples, the input signal may be any other input signal for which a highly linear, high output voltage across a load is desired.

At operation 204, the buck-boost control loop 100 generates the variable de-energizing phase duty cycle $D_d$ based on the input signal to optimize for a low duty cycle in the freewheeling phase. In an example, as shown in equation (1), $D_d$ is set according to a ratio of the power supply voltage to an absolute value of the input signal plus the power supply voltage. In many cases, the ratio is scaled by a desired freewheeling duty cycle. In some cases, the desired freewheeling duty cycle is a constant.

In another example, as shown in equation (2), $D_d$ is set according to a ratio of the power supply voltage to a quantity determined as: a sum of a square root of the input signal squared plus a real positive coefficient squared, plus the power supply voltage. In some cases, the real positive coefficient is a constant. In other cases, e.g., as shown in equation (3), the real positive coefficient is variable and set to a low pass filtered version of the input signal. In still other cases, e.g., as shown in equation (4), the real positive coefficient is variable and set to the derivative of the input signal.

At operation 206, the buck-boost control loop 100 generates the variable energizing phase duty cycle $D_e$ based on a feedback loop tracking an input signal. In an example, as shown in equation (5), $D_e$ is set according to $D_d$ scaled by a ratio of the input signal to the power supply voltage. In some examples, the desired freewheeling duty cycle is a constant.

At operation 208, the buck-boost control loop 100 controls the tri-state buck-boost converter 102 using the variable energizing phase duty cycle $D_e$ and the variable de-energizing phase duty cycle $D_d$. For instance, as shown in FIG. 1, in the energizing duty cycle $D_e$, switches $S_{1p}$ and $S_{3n}$ or switches $S_{1n}$ and $S_{3p}$ are closed, and the rest are open; in the de-energizing duty cycle $D_d$, switches $S_{2p}$ and $S_{2n}$ are closed, and the rest are open; and in the freewheeling phase between $D_e$ and $D_d$ the switches $S_{3p}$ and $S_{3n}$ are closed, and the rest are open. After operation 206, the process 200 continues at operation 202. It should be noted that while the process 200 is shown as being iterative, the operations of the process 200 may be performed in various orderings, as well as in a continuous and/or overlapping manner.

Thus, the disclosed approach provides a high efficiency, highly linear architecture for general voltage driver applications. In one non-limiting example, such an approach may be used for class H audio amplification applications giving a high power, linear output. As compared with class H boost and class D amplifier approaches, the disclosed circuit enhances efficiency due to its reduction in the number of switching stages from two to one.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A tri-state buck-boost system having a freely changeable de-energizing duty cycle, comprising:
    a tri-state buck-boost converter configured to operate in an energizing phase in which energy of an inductor is increased, a de-energizing phase in which the energy of the inductor is decreased, and a freewheeling phase in which the energy of the inductor is allowed to recirculate, the tri-state buck-boost converter configured to produce a voltage output based on a power supply voltage, a variable energizing phase duty cycle $D_e$ for operation in the energizing phase, and a variable de-energizing phase duty cycle $D_d$ for operation in the de-energizing phase; and
    a buck-boost control loop, configured to:
        generate the variable de-energizing phase duty cycle $D_d$ based on an input signal to optimize for a low duty cycle in the freewheeling phase,
        generate the variable energizing phase duty cycle $D_e$ based on the control loop tracking the input signal, and
        control the tri-state buck-boost converter using the variable energizing phase duty cycle $D_e$ and the variable de-energizing phase duty cycle $D_d$.

2. The tri-state buck-boost system of claim 1, where $D_e$ is set based on $D_d$ scaled by a ratio of the input signal to the power supply voltage, plus a feedback signal.

3. The tri-state buck-boost system of claim 1, where $D_d$ is set according to a ratio of the power supply voltage to an absolute value of the input signal plus the power supply voltage.

4. The tri-state buck-boost system of claim 3, where the ratio is scaled by a factor based on a desired freewheeling duty cycle.

5. The tri-state buck-boost system of claim 4, wherein the desired freewheeling duty cycle is a constant.

6. The tri-state buck-boost system of claim 1, where $D_d$ is set according to a ratio of the power supply voltage to a quantity determined as: a sum of a square root of the input signal squared plus a real coefficient squared, plus the power supply voltage.

7. The tri-state buck-boost system of claim 6, where the real coefficient is a constant.

8. The tri-state buck-boost system of claim 6, where the real coefficient is variable and set to a low pass filtered version of the input signal.

9. The tri-state buck-boost system of claim 6, where the real coefficient is variable and set to the derivative of the input signal scaled by a scaling factor.

10. The tri-state buck-boost system of claim 1, wherein the tri-state buck-boost converter includes a plurality of switches, such that in the energizing phase the switches are set such that current flows from the power supply voltage through the inductor such that current in the inductor rises, in the de-energizing phase the switches are set such that the current flows from the inductor to the voltage output, and in the freewheeling phase the switches are set such that the current recirculates through the inductor.

11. The tri-state buck-boost system of claim 1, wherein the buck-boost control loop comprises:
- a subtracter configured to determine a difference between the input signal and the voltage output to use as an error signal;
- a gain equalizer configured to receive the error signal and $D_d$, and compute an output indicative of $D_e$ to achieve a constant unity gain bandwidth;
- a loop filter configured to suppress non-linearity and to stabilize the buck-boost control loop; and
- an input feedforward configured to provide $D_d$, the input signal, and the power supply voltage as additional inputs to inform $D_e$.

12. The tri-state buck-boost system of claim 11, wherein the gain equalizer is configured to compute the output indicative of $D_e$ by multiplying the error signal by a factor of $K/D_d$.

13. The tri-state buck-boost system of claim 11, wherein the buck-boost control loop comprises:
- a digital-to-analog converter (DAC) configured to receive the input signal in digital form and provide an analog input signal, such that the subtracter operates in the analog domain; and
- an analog-to-digital converter (ADC) configured to provide a digital filter output to the gain equalizer.

14. The tri-state buck-boost system of claim 13, wherein the loop filter is implemented in the analog domain between the subtracter and the ADC.

15. The tri-state buck-boost system of claim 14, wherein the loop filter is implemented as a low pass filter.

16. The tri-state buck-boost system of claim 15, wherein the low pass filter is a high-order low pass filter.

17. The tri-state buck-boost system of claim 11, wherein the loop filter is implemented in the digital domain after the gain equalizer.

18. The tri-state buck-boost system of claim 11, wherein the buck-boost control loop comprises:
- an analog-to-digital converter (ADC) configured to provide a digital output of the voltage output, wherein the subtracter operates in the digital domain.

19. A method for operation of a tri-state buck-boost system, comprising:
- generating a variable de-energizing phase duty cycle $D_d$ based on an input signal to optimize for a low duty cycle in a freewheeling phase;
- generating a variable energizing phase duty cycle $D_e$ based on a buck-boost control loop tracking the input signal; and
- controlling a tri-state buck-boost converter using the variable energizing phase duty cycle $D_e$ and the variable de-energizing phase duty cycle $D_d$.

20. The method of claim 19, further comprising setting $D_e$ according to $D_d$ scaled by a ratio of the input signal to power supply voltage, plus a feedback signal.

21. The method of claim 19, further comprising setting $D_d$ according to a ratio of power supply voltage to an absolute value of the input signal plus the power supply voltage.

22. The method of claim 21, further comprising scaling the ratio by a factor based on a desired freewheeling duty cycle.

23. The method of claim 22, wherein the desired freewheeling duty cycle is a constant.

24. The method of claim 19, further comprising setting $D_d$ according to a ratio of power supply voltage to a quantity determined as: a sum of a square root of the input signal squared plus a real coefficient squared, plus the power supply voltage.

25. The method of claim 24, where the real coefficient is a constant.

26. The method of claim 24, where the real coefficient is variable and further comprising setting the real coefficient to a low pass filtered version of the input signal.

27. The method of claim 24, where the real coefficient is variable and further comprising setting the real coefficient to the derivative of the input signal scaled by a scaling factor.

\* \* \* \* \*